US005930829A

United States Patent [19]

Little

[11] Patent Number: 5,930,829

[45] Date of Patent: Jul. 27, 1999

[54] DYNAMIC MEMORY ALLOCATION FOR A RANDOM ACCESS MEMORY EMPLOYING SEPARATELY STORED SPACE ALLOCATION INFORMATION USING A TREE STRUCTURE

[75] Inventor: Frank S. Little, Phoenix, Ariz.

[73] Assignee: Bull HN Information Systems Inc., Bitlerica, Mass.

[21] Appl. No.: 08/829,391

[22] Filed: Mar. 31, 1997

[51] Int. Cl.[6] ...... G06F 12/00

[52] U.S. Cl. ...... 711/170; 711/173; 711/104

[58] Field of Search ...... 711/173, 170, 711/171, 104, 102, 103, 105; 395/876, 674

[56] References Cited

U.S. PATENT DOCUMENTS

| | | | |
|---|---|---|---|
| 5,247,634 | 9/1993 | Cline et al. | 364/245 |
| 5,561,786 | 10/1996 | Morse | 711/170 |
| 5,715,455 | 2/1998 | Macon, Jr. et al. | 395/652 |
| 5,784,698 | 7/1998 | Brady et al. | 711/171 |
| 5,784,699 | 7/1998 | McMahon et al. | 711/171 |

*Primary Examiner*—Eddie P. Chan
*Assistant Examiner*—Kimberly Nicole McLean

[57] ABSTRACT

Allocation information for a random access memory is stored in a separate memory or memory area. Each memory block in the RAM is divided into $2^n$ equal-sized spaces, and a memory allocation tree structure is established which stores, in a separate random access memory (which can be a dedicated, non-allocable section of the first random access memory), a single space availability indicator at a first level representing $2^n$ equal-sized spaces, a pair of pair of space availability indicators at a second level each representing $2^{n-1}$ equal-sized spaces, and so on until a plurality of space availability indicators are placed at a suitable lower level tree structure such that each represents a single equal-sized space. When a request for allocation of memory space is made, the allocation information for a memory block is checked to determine if a space availability indicator at the level which could accommodate the request is set to the first value. (If not, a different memory block is checked.) When a space availability indicator is found to be set to the first value, the represented space is allocated to service the request. In addition, the checked space availability indicator, and all the space availability indicators in the tree structure above and below it, are set to the second value.

4 Claims, 4 Drawing Sheets

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| A | | NOT USED | | | | | | | | | | | | | | | | | | | | | | | | | | | | | | |
| B | | | NOT USED | | | | | | | | | | | | | | | | | | | | | | | | | | | | | |
| C | | | | | NOT USED | | | | | | | | | | | | | | | | | | | | | | | | | | | |
| D | | | | | | | | | NOT USED | | | | | | | | | | | | | | | | | | | | | | | |
| E | | | | | | | | | | | | | | | | | NOT USED | | | | | | | | | | | | | | | |
| F | | | | | | | | | | | | | | | | | | | | | | | | | | | | | | | | |
| G | BASE ADDRESS | | | | | | | | | | | | | | | | | | | | | | | | | | | | | | | |
| H | SIZE | | | | | | | | | | | | | | | | | | | | | | | | | | | | | | | |

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| A | 0 | NOT USED | | | | | | | | | | | | | | | | | | | | | | | | | | | | | | |
| B | 0 | 0 | NOT USED | | | | | | | | | | | | | | | | | | | | | | | | | | | | | |
| C | 0 | 0 | 0 | 0 | NOT USED | | | | | | | | | | | | | | | | | | | | | | | | | | | |
| D | 0 | 0 | 0 | 0 | 0 | 0 | 0 | 0 | NOT USED | | | | | | | | | | | | | | | | | | | | | | | |
| E | 0 | 0 | 0 | 0 | 0 | 0 | 0 | 0 | 0 | 0 | 0 | 0 | 0 | 0 | 0 | 0 | NOT USED | | | | | | | | | | | | | | | |
| F | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| G | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 1 | 0 | 1 |
| H | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 |

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| A | 0 | NOT USED | | | | | | | | | | | | | | | | | | | | | | | | | | | | | | |
| B | 0 | 0 | NOT USED | | | | | | | | | | | | | | | | | | | | | | | | | | | | | |
| C | 0 | 0 | 0 | 0 | NOT USED | | | | | | | | | | | | | | | | | | | | | | | | | | | |
| D | 1 | 0 | 0 | 0 | 0 | 0 | 0 | 0 | NOT USED | | | | | | | | | | | | | | | | | | | | | | | |
| E | 0 | 0 | 0 | 0 | 0 | 0 | 0 | 0 | 0 | 0 | 0 | 0 | 0 | 0 | 0 | 0 | NOT USED | | | | | | | | | | | | | | | |
| F | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| G | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 1 | 0 | 1 |
| H | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 |

FIG. 6

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| A | 1 | NOT USED | | | | | | | | | | | | | | | | | | | | | | | | | | | | | | |
| B | 1 | 1 | NOT USED | | | | | | | | | | | | | | | | | | | | | | | | | | | | | |
| C | 1 | 0 | 0 | 0 | NOT USED | | | | | | | | | | | | | | | | | | | | | | | | | | | |
| D | 1 | 0 | 0 | 0 | 0 | 0 | 0 | 0 | NOT USED | | | | | | | | | | | | | | | | | | | | | | | |
| E | 1 | 1 | 0 | 0 | 0 | 0 | 0 | 0 | 0 | 0 | 0 | 0 | 0 | 0 | 0 | 0 | NOT USED | | | | | | | | | | | | | | | |
| F | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| G | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 1 | 0 | 1 |
| H | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 |

FIG. 7

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| A | 1 | NOT USED | | | | | | | | | | | | | | | | | | | | | | | | | | | | | | |
| B | 1 | 1 | NOT USED | | | | | | | | | | | | | | | | | | | | | | | | | | | | | |
| C | 1 | 0 | 1 | 1 | NOT USED | | | | | | | | | | | | | | | | | | | | | | | | | | | |
| D | 1 | 0 | 0 | 0 | 1 | 1 | 1 | 1 | NOT USED | | | | | | | | | | | | | | | | | | | | | | | |
| E | 1 | 1 | 0 | 0 | 0 | 0 | 0 | 0 | 1 | 1 | 1 | 1 | 1 | 1 | 1 | 1 | NOT USED | | | | | | | | | | | | | | | |
| F | 1 | 1 | 1 | 1 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |
| G | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 1 | 0 | 1 |
| H | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 |

FIG. 8

DYNAMIC MEMORY ALLOCATION FOR A RANDOM ACCESS MEMORY EMPLOYING SEPARATELY STORED SPACE ALLOCATION INFORMATION USING A TREE STRUCTURE

FIELD OF THE INVENTION

This invention relates to the art of information storage in a data processing system and, more particularly, to efficient and highly reliable method and apparatus for dynamically allocating storage space in a storage device, such as a random access memory ("RAM"), in which the storage space is divided into memory blocks.

BACKGROUND OF THE INVENTION

Conventionally, methods and apparatus for dynamically allocating memory in a RAM function to store the information about how the memory is allocated inside the memory itself. As is well known in the art, this approach can cause problems since the allocation information can be destroyed by the programs that are using the memory.

It has been considered in the past, in order to overcome the danger that a program using a RAM will corrupt the integral dynamic allocation information, to place the dynamic allocation information in a separate memory which may be a separate area of RAM. However, all known prior art attempts at implementing this approach have proven to be unacceptably inefficient because the information was stored in substantially the same form as with integrated storage which brought about the necessity to reference both memories (or areas of RAM) to establish, maintain and use the dynamic allocation information. Further, with this approach to the use of a separate memory to store the allocation information, it has been very difficult to determine when and how relinquished memory areas can be joined for subsequent allocation.

OBJECTS OF THE INVENTION

It is therefore a broad object of this invention to provide a safe and highly efficient method and apparatus for maintaining and using a dynamic allocation table for a RAM, which is divided into memory blocks.

It is another object of this invention to provide such method and apparatus which isolates the dynamic allocation table from potential corruption by programs using the allocated memory.

It is a more specific object of this invention to provide such method and apparatus in which the dynamic allocation information is stored in a memory separate from the allocated memory.

It is a still more specific object of this invention to provide such method and apparatus in which the dynamic allocation table is maintained and used without reference to the allocated memory, thus rendering it possible to allocate virtual memory which can be implemented, in whole or part, by physical memory which is currently resident in a mass memory device.

In another aspect, it is an object of this invention to provide such method and apparatus in which the totality of an area of mass memory can be allocated using the same technique as used for allocating portions of that memory.

SUMMARY OF THE INVENTION

Briefly, these and other objects of the invention are achieved by maintaining dynamic allocation information for a RAM in a separate memory or memory area and configuring the allocation control structure for highly efficient searching and updating without the need to reference the allocated memory itself. More particularly, method and apparatus are disclosed for allocating space in a random access memory comprising a plurality of allocable memory blocks. Each memory block is divided into $2^n$ equal-sized spaces, and a memory allocation tree structure is established which stores, in the separate random access memory (which can be a dedicated, non-allocable section of the first random access memory) a single space availability indicator at a first level representing $2^n$ equal-sized spaces, a pair of pair of space availability indicators at a second level each representing $2^{n-1}$ equal-sized spaces, and so on until a plurality of space availability indicators are placed at a suitable lower level tree structure such that each represents a single equal-sized space. Each space availability indicator has a first value if space in the indicated amount is available in the tree structure branch in which that space availability indicator is situated and has a second value if space in the indicated amount is not available in the tree structure branch in which that space availability indicator is situated. When a request for the allocation of a given amount of memory space is made, the allocation information for a memory block is checked to determine if a space availability indicator at the level which could accommodate the request is set to the first value. (If not, a different memory block is checked and so on until sufficient space is found.) When a space availability indicator is found to be set to the first value, the represented space is allocated to service the request. In addition, the space availability indicator found to be set to the first value is set to the second value, all the space availability indicators in the tree structure below the space availability indicator examined are changed to the second value and all the space availability indicators in the tree structure above the space availability indicator examined which are not already set to the second value are set to the second value, thereby updating the allocation information for the affected memory block.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 4 is an example of the information stored in the separate memory in conjunction with a specific memory block in the RAM which does not yet have any of its storage space allocated to the use of a program;

FIG. 6 is a view similar to FIG. 5 which illustrates an essential second step in completing the assignment in the exemplary memory block of the memory space of requested size to the requesting program;

FIG. 7 shows the effect of a subsequent granted request for memory space in the exemplary block in the allocation information for the exemplary block stored in the separate memory;

FIG. 8 shows the effect of a second subsequent granted request for memory space in the exemplary block in the allocation information for the exemplary block stored in the separate memory;

DETAILED DESCRIPTION OF THE PREFERRED EMBODIMENT(S)

Figure 1:
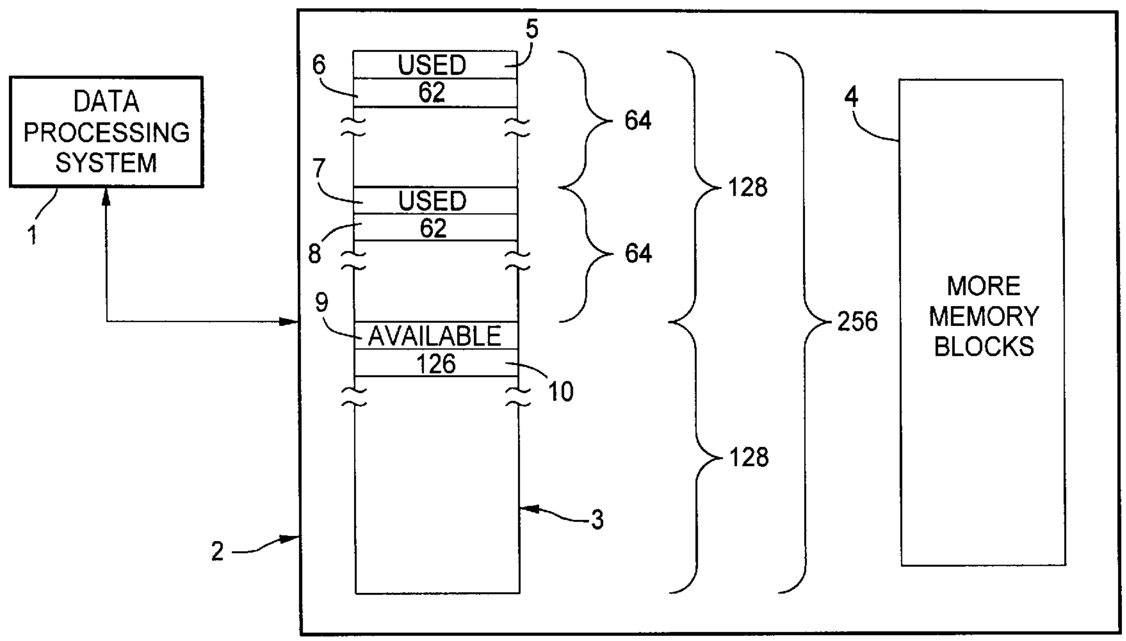
FIG. 1 is a high level block diagram of a data processing system employing a prior art RAM.

Referring now to FIG. 1, there is shown a high level block diagram of an exemplary prior art data processing system 1 which conventionally includes a random access memory (RAM) 2. The RAM 2 includes a sample memory block 3 which is one of many memory blocks 4. In the example, each memory block is composed of 256 eight-byte spaces (typically, memory sizes are established in powers of two in order for ease of use in binary arithmetic). As well known to those skilled in the art, a request for memory space by a program running on the data processing system 1 is conventionally fulfilled by selecting a block in the RAM 2 which has sufficient unallocated memory space for accommodating the request and then determining, by the examination of allocation information stored directly in the selected block, what space in the block is appropriate for allocation to fulfill the request.

More particularly, in accordance with conventional practice, assume that the example block 3 has already had two 64-byte spaces assigned to the use of programs as a result of earlier granted requests. Two bytes of each assigned space are reserved for indicating, respectively, that a space has been allocated and the size of the allocated space. In the example, the first byte 5 in the block indicates that a space has been allocated, and the second byte 6 indicates the useable size of the space which has been allocated which is sixty-two (64–2) bytes. (in some large RAMs, more than one byte may be required to specify size.) Similarly, another earlier request has resulted in the allocation of another 64-byte space constituting indicator byte 7 and allocated size byte 8. Thus, previous to the current request, the next indicator, resident in indicator byte 9, shows that there is still allocable space available in the block 3 and space byte 10 indicates that the size of the available space is 126 (128–2) bytes. If the current request is for, say, at least twenty-four bytes, but no more than thirty bytes, the request can be granted by changing the indication in byte 9 from "available" to "used" and entering "30" (32–2) into the size indicator byte 10. In the two locations following the end of the just-allocated space, a new "available" indicator and the size "94" will be entered showing that there is still space available in the block 3.

As previously mentioned, the foregoing description of FIG. 1 will be familiar to those skilled in the art. Further, it is well known to use such space selection algorithms as "first fit", "best fit" and "worst fit" in conjunction with the allocation of memory space.

There are drawbacks to the use of this prior art approach. First, the selection and allocation process is relatively slow to carry out, requiring the RAM 2 to itself be accessed and analyzed before an allocation request can be serviced. Second, after an allocation has been made, programs using allocated space in a given memory block can, and sometimes do, corrupt the indicator bytes (e.g., the bytes 5, 6, 7, 8, 9, 10 in FIG. 1) with manifest catastrophic results. Third, some memory space must be used for storing the allocation information.

Figure 2:
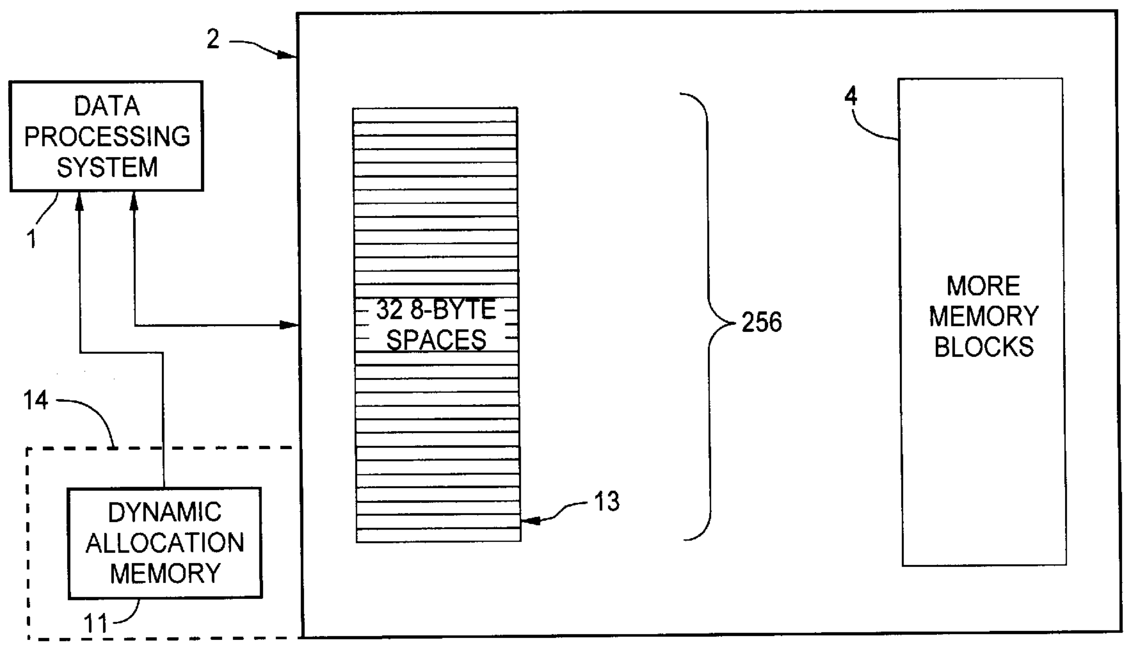
FIG. 2 is high level block diagram similar to FIG. 1, but illustrating a different configuration for the allocation and tracking of memory space in the RAM and a separate memory for storing the allocation information in accordance with the present system.

Attention is now directed to FIG. 2 which is a high level block diagram of a data processing system 1 including a RAM 2 and also a dynamic allocation memory 11 according to the present invention. In the subject system, memory allocation information is not stored in the allocable RAM itself, but is developed and stored in the dynamic allocation memory 11 without the need to access the allocable RAM as will be explained more fully below. Preferably, dynamic allocation memory 11 is a high speed RAM, and it will be understood, as represented by the dashed line 14, that dynamic allocation memory 11 may be entirely separate from the RAM 2 or may be a separate, unallocable area of RAM 2.

In accordance with the invention, each allocable block in the RAM 2 is fundamentally subdivided into a plurality of equal size, relatively small spaces. In the example shown in FIG. 2, a 256-byte memory block 13 is divided into thirty-two eight-byte spaces, and the thirty-two spaces are related to one another in accordance with a tree structure.

Figures 3, 4, 5:
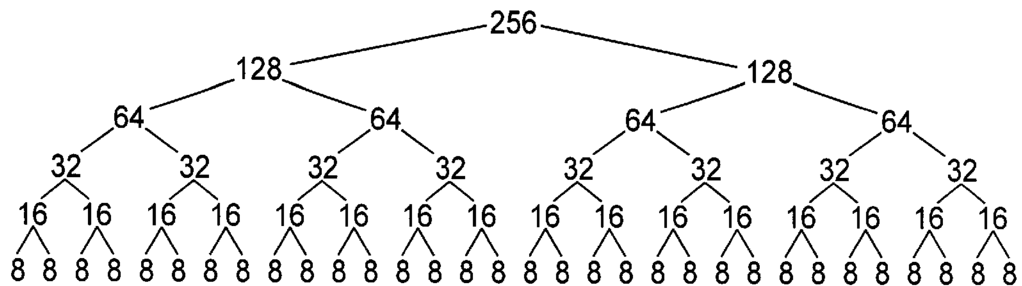
FIG. 3 is an illustration of a tree structure illustrating a relationship between different levels corresponding to different size memory spaces.
FIG. 4 illustrates a presently preferred configuration for use in the separate memory to track the space allocation in one block of the RAM.
FIG. 5 is a view similar to FIG. 4 which illustrates a first step in the assignment in the exemplary memory block of a memory space of requested size to a requesting program.

Thus, referring to FIG. 3, the relationship of the thirty-two allocable spaces in RAM 2 may be appreciated. More particularly, each pair of eight-byte spaces are also deemed to constitute a sixteen-byte space. Similarly, each pair of sixteen-byte spaces also constitute a 32-byte space. Each pair of 32-byte spaces also constitute a 64-byte space and each pair of 64-byte spaces also constitute a 128-byte space. Finally, the two 128-byte spaces constitute a single 256-byte space.

The format of an exemplary memory allocation table employed in the dynamic allocation memory 11 for a given allocable memory block, e.g., the memory block 13, in the RAM 2 is shown in FIG. 4. It will be seen that the exemplary memory allocation information is disposed in an array of eight thirty-two bit words. For convenience in identifying individual cells in the array, the "rows" (words) are identified by the letter A–H and the "columns" by the numbers 0–31. In row A, only bit 0 is used, and it stores an indicator for the number 256 in the tree structure shown in FIG. 3. Similarly, in row B, only bits 0 and 1 are used as there are only two 128-byte size indicators in the tree structure. Correspondingly, row C uses bits 0–3 to store the 64-byte indicators, row D uses bits 0–7 to store the 32 byte indicators, row E uses bits 0–15 to store the sixteen-byte indicators and row F uses bits 0–31 to store the eight-byte indicators. Row G is used to store the base address of a given block in the mass memory device, and row H is used to store the size of the block.

Attention is now directed to FIG. 5 for an example of the allocation information stored in the dynamic allocation memory 11 for a 256-byte block having a base address of $37_{10}$ (100101 binary) and in which all the space is available. In this example, a logic "0" indicates available and a logic "1" indicates allocated.

Thus, all the bits employed in rows A–F are set to "0" and, in row G, bits 26, 19 and 31 are set to "1" to indicate a base address of $37_{10}$ for the block controlled by the table, and, in row H, bit 23 is set to "1" to indicate that the block is 256 bytes in length.

Now, referring to FIGS. 2, 4 and 5, consider the case in which a program running on the data processing system 1 requests a 32-byte memory space in the block allocated in accordance with the table shown in FIG. 5. The dynamic allocation memory 11 checks row D for the presence of a "0" (typically, in a predetermined order such as from most significant bit to least significant bit) and finds one in the first cell, D0, indicating that a 32-byte space is indeed available. As shown in FIG. 6, the dynamic allocation memory 11 therefore sets this bit to "1" to change the status of the identified 32-byte space to "used".

In addition, other action is immediately taken by the dynamic allocation memory 11. Referring to FIG. 7, inasmuch as the 32-byte space assigned to the requesting program and identified by bit D0 in the allocation table is also identified by the two sixteen-byte indicator bits E0 and E1 and also by the four eight-byte indicator bits F0, F1, F2, F3, all of these indicator bits are also set to "1".

Still further, and a key aspect of the invention, if either one of any pair of indicator bits in the tree structure (see also FIG. 3) is set to "1", then all bits in the tree structure above the pair are also set to "1". Therefore, in FIG. 7, bits C0, B0 and A0 are also set to "1". This is meaningful because, if, for example, a 32-byte space is taken in a given branch of the tree structure represented by the allocation information, the 64-byte branch above, the 128-byte above and the 256-byte branch above are all no longer available. That is, if, for example, a 32-byte space has been allocated for a given block, then it follows that a program later requesting a full 256-byte space must look to another block.

However, consider the case in which a request is subsequently received from a program running on the system for a 128-byte space. The allocation table illustrated in FIG. 7 for block $37_{10}$ reveals that, as indicated by bit B1, a 128-byte space is indeed still available. When this space is assigned to the requesting program, not only is bit B1 set to "1", but so are bits C2, C3, D4, D5, D6, D7, E8–E15, inclusive, and bits F16–F31, inclusive. After this most recent allocation, it will be seen that bit C1 is still logic "0" indicating that one 64-byte space is still available in the block. Similarly, bits D1, D2, D3 indicate that three 32-byte spaces remain available, bits E2–E7 indicate that six sixteen-byte spaces remain available and bits F4–F15 indicate that twelve eight-byte spaces remain available.

Figure 9:
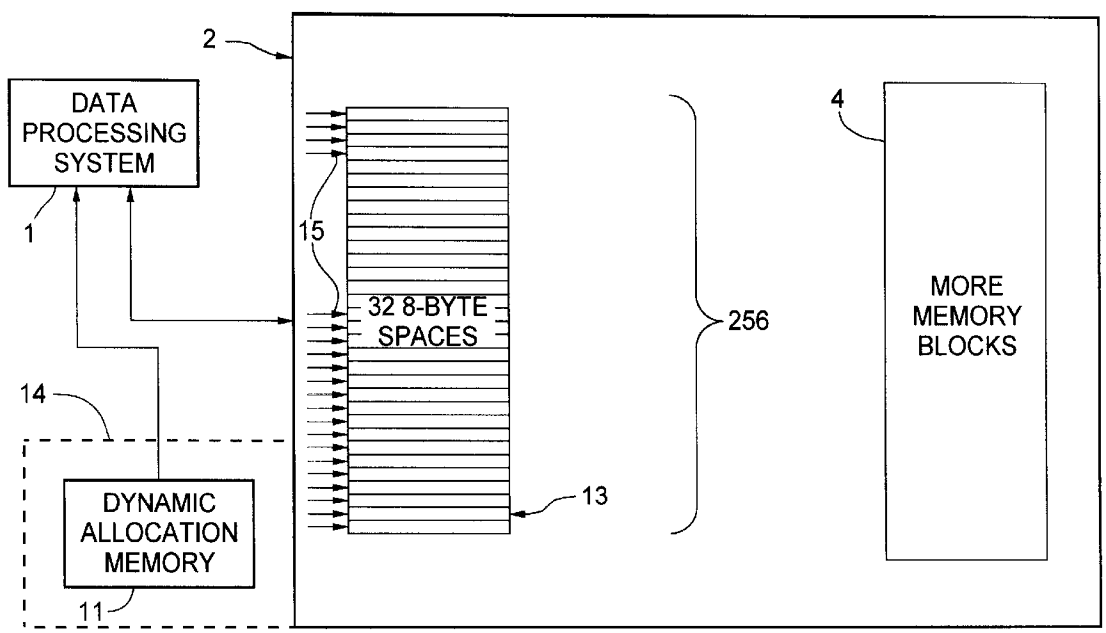
FIG. 9 is a view similar to FIG. 2 and illustrates which eight-byte spaces in the exemplary memory block have been allocated as reflected by the memory allocation information stored in the separate memory as shown in FIG. 8.

FIG. 9 shows the status of memory block 13 (i.e., the memory block having a base address of $37_{10}$ in the example) after the allocation of its space stored in the dynamic allocation memory 11 as shown in FIG. 8. The allocated spaces are denoted by arrows 15 placed immediately to the left of the representation of the eight-byte spaces constituting the memory block 13.

Figure 10:
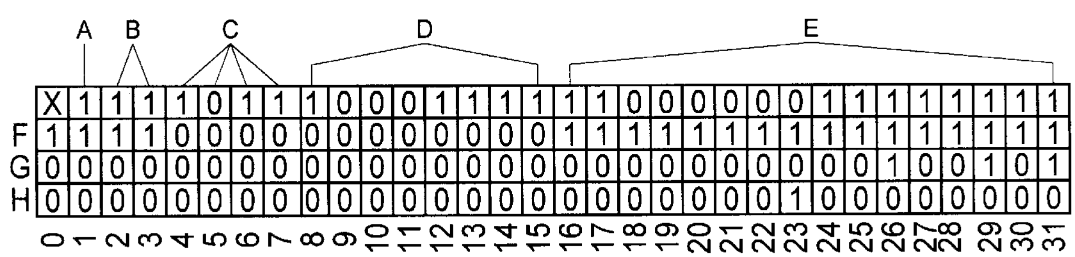
FIG. 10 illustrates an alternative configuration for the allocation tables stored in the separate memory.

In the configuration for the allocation information shown in FIGS. 4–8, eight 32-bit words are required for storing, in the dynamic allocation memory 11, the allocation information for each allocable block in the RAM 2. It is possible to reduce this space requirement by packing the fields for the upper levels (or even all) the indicator bits as shown in FIG. 10. Thus, fields A, B, C, D and E are packed into a first word of the allocation information for exemplary allocable block $37_{10}$ (the first bit is not used), and the remainder of the allocation information contained in words, F, G and H, remain the same as previously discussed. This configuration permits the retention of 32-bit words. If, however, the dynamic allocation memory 11 is configured in 64-bit words, the allocation table for each memory block could be reduced to two words, the first containing all the indicator bits for the spaces in the exemplary block and the second concatenating the base address and size of the block.

As a practical matter, the table configuration shown in FIGS. 4–8 is preferred. Then, for example, if there is a request for a 128-byte space, it is only necessary to test row/word B for a "less than 11" condition (testing only bits B0 and B1). If the condition is met, there is at least one 128-bit space available; if the condition is not met, there is no 128-bit space available in this block, and the allocation table for another block must be examined for space availability. As those skilled in the art will understand, such a test can be carried out very quickly using conventional masking or other well known techniques.

In some data processing families, it is desirable to reverse the meaning of the bit indicators to facilitate testing for space availability. Then, a given word/row need only be tested for a "greater than zero value" condition to determine is space is available in the requested size in the given block. Consider, for example, row C in FIG. 7 with the convention reversed so that the row reads "0100" rather than "1011". A simple "greater than zero" test on row/word C quickly indicates that a 64-space bit is available in the identified block in RAM 2.

Further variation rendering the configuration of the allocation information for different data processing families is also contemplated. For example, the tree structure can be moved to the least significant end of the words A, B, C, D and E. That is, the indicator bit for the 256-byte space is placed into cell A31 rather than cell A0, the two indicator bits for the 128-byte spaces are placed into cells B30 and B31 rather than cells B0 and B1, etc.

In another variation, there may be advantage in some logic families, to facilitate rapid calculation of the physical address of an available space by logical combination with the base address information, in positioning the single bit representing the single 256-byte space in cell A15, the two bits representing the two 128-byte spaces in cells, B15 and B31, the four bits representing the four 64-byte spaces in cells C7, C15, C23 and C31, etc.

Thus, while the principles of the invention have now been made clear in an illustrative embodiment, there will be immediately obvious to those skilled in the art many modifications of the structure, arrangements, proportions, elements, materials, and components, used in the practice of the invention which may be particularly adapted for specific environments and operating requirements without departing from those principles.

What is claimed is:

1. A method for allocating space in a random access memory comprising a plurality of allocable memory blocks comprising the steps of:

A) dividing each memory block into $2^n$ equal-sized allocable spaces which are devoid of memory allocation information;

B) establishing a memory allocation tree structure in which:

1) a single-bit space availability indicator at a first level represents $2^n$ equal-sized allocable spaces;

2) a pair of single-bit space availability indicators at a second level each represents $2^{n-1}$ equal-sized allocable spaces;

3) a plurality of single-bit space availability indicators at a level lower than the second level each represents a single equal-sized allocable space; and 4) each single-bit space availability indicator has a first binary value if allocable space in the indicated amount is available in the tree structure branch which that single bit space availability indicator represents and a second binary value if allocable space in the indicated amount is not available in the tree structure branch which that single-bit space availability indicator represents;

C) storing the memory allocation tree structure in a dynamic memory allocation memory which is separate from the plurality of allocable memory blocks;

D) when a request for the allocation of a given amount of allocable memory space is made, checking the memory allocation tree structure to determine if a single-bit space availability indicator at the level which could accommodate the request is set to the first binary value;

E) if no single-bit space availability indicator checked in step D) is set to the first binary value, returning to step D) to check the allocation information for the availability for allocation of a different allocable memory block in the requested amount;

F) if a single-bit space availability indicator checked in step D) is set to the first binary value:

1) allocating the represented allocable space to service the request;

2) changing the single-bit space availability indicator found to be set to the first binary value in step D) to the second binary value;

3) changing to the second binary value all the single-bit space availability indicators in the tree structure below the single-bit space availability indicator changed in step F)2); and 4) changing to the second binary value all the single-bit space availability indicators in the tree structure above the single-bit space availability indicator changed in step F)2) which are not already set to the second binary value.

2. The method of claim 1 in which the dynamic allocation memory is a dedicated, non-allocable, section of the random access memory.

3. A data processing system including first and second random access memories and in which:

A) the first random access memory is divided into a plurality of memory blocks, each memory block having $2^n$ equal-sized allocable spaces which are devoid of memory allocation information;

B) the second random access memory is a dynamic allocation memory for the first random access memory and storing a memory allocation tree structure therefor in which:

1) a single-bit space availability indicator at a first level represents $2^n$ equal-sized allocable spaces in the first random access memory;

2) a pair of single-bit space availability indicators at a second level each represents $2^{n-1}$ equal-sized allocable spaces in the first random access memory; and 3) a plurality of single-bit space availability indicators at a level lower than the second level each represents a single equal-sized allocable space in the first random access memory;

4) each single-bit space availability indicator has a first binary value in the tree structure branch in which that space availability indicator is situated if allocable space in the indicated amount is available in a memory block of the first random access memory represented thereby and a second binary value if space in the indicated amount is not available in the memory block of the first random access memory represented thereby; such that:

C) when a request for the allocation of a given amount of allocable memory space in the first random access memory is made, the allocation information, stored in the second random access memory, for a memory block is checked to determine if a single-bit space availability indicator at the level which could accommodate the request is set to the first binary value;

D) if no single-bit space availability indicator checked is set to the first binary value, the allocation information in the second random access memory for a different memory block is checked for availability of sufficient space in the first random access memory; and E) if a single-bit space availability indicator checked is set to the first binary value:

1) the represented space in the first random access memory is allocated to service the request;

2) the single-bit space availability indicator found to be set to the first binary value is changed to the second binary value;

3) all the single-bit space availability indicators in the tree structure below the single-bit space availability indicator changed in F)2) are changed to the second binary value; and 4) all the single-bit space availability indicators in the tree structure above the single-bit space availability indicator changed in F)2) which are not already set to the second binary value are changed to the second binary value.

4. The data processing system of claim 3 in which the dynamic allocation memory is a dedicated, non-allocable, section of the random access memory.

* * * * *